United States Patent [19]
Hurter et al.

[11] Patent Number: 5,106,960
[45] Date of Patent: Apr. 21, 1992

[54] AZO DYES AND THE PRODUCTION AND USE THEREOF

[75] Inventors: Rudolf Hurter, Basel; Dieter Mäusezahl, Biel-Benken, both of Switzerland

[73] Assignee: Ciba-Geigy Corporation, Ardsley, N.Y.

[21] Appl. No.: 674,295

[22] Filed: Mar. 22, 1991

Related U.S. Application Data

[63] Continuation of Ser. No. 14,130, Feb. 4, 1987, abandoned, which is a continuation of Ser. No. 828,610, Feb. 12, 1986, abandoned, which is a continuation of Ser. No. 246,340, Mar. 23, 1981, abandoned.

[30] Foreign Application Priority Data

Mar. 28, 1980 [CH] Switzerland .................. 2492/80

[51] Int. Cl.$^5$ ............................................. C09B 29/00
[52] U.S. Cl. ...................... 534/845; 534/641; 534/642; 534/771; 534/772; 534/773; 534/782; 534/783; 534/784; 534/635; 534/636; 534/638; 534/632; 534/847; 534/872; 534/875; 534/643; 534/798; 534/876
[58] Field of Search .......... 534/642, 845, 847, 875, 534/772, 782, 783

[56] References Cited

U.S. PATENT DOCUMENTS

| | | | |
|---|---|---|---|
| 2,128,225 | 8/1938 | Kizikalla et al. | 534/642 X |
| 2,151,857 | 3/1939 | Manz et al. | 534/642 X |
| 2,670,265 | 2/1954 | Heyna et al. | 534/642 X |
| 3,050,516 | 8/1962 | Merian et al. | 534/642 X |
| 3,104,237 | 9/1963 | Frisch | 260/196 |
| 3,657,220 | 4/1972 | Kilmurry | 260/207.1 |
| 3,859,271 | 1/1975 | Sugiyama et al. | 534/642 |
| 3,923,780 | 12/1975 | Harmon et al. | 534/847 |
| 4,008,320 | 2/1977 | Conrow et al. | 514/150 |
| 4,036,825 | 7/1977 | Fuchs et al. | 534/642 |
| 4,046,756 | 9/1977 | Maderni et al. | 260/205 |
| 4,046,757 | 9/1977 | Meybeck et al. | 260/207.1 |
| 4,048,154 | 9/1977 | Westphal | 260/207.1 |
| 4,099,909 | 7/1978 | Koller et al. | 534/847 X |
| 4,119,624 | 10/1978 | Boyd et al. | 534/847 X |
| 4,148,791 | 4/1979 | Altermatt | 260/207.1 |
| 4,159,325 | 6/1979 | Eliasson | 514/150 |
| 4,249,275 | 2/1981 | Hugh et al. | 260/205 X |
| 4,267,104 | 5/1981 | Giles et al. | 260/207.1 |
| 4,313,872 | 2/1982 | Heinrich et al. | 534/847 X |
| 4,315,865 | 2/1982 | Hoyer et al. | 534/642 X |
| 4,324,722 | 4/1982 | vor der Brück et al. | 260/207.1 |
| 4,324,723 | 4/1982 | vor der Brück et al. | 260/207.1 |
| 4,412,992 | 11/1983 | Chan | 514/150 |

FOREIGN PATENT DOCUMENTS

| | | |
|---|---|---|
| 13505 | 7/1980 | European Pat. Off. . |
| 14031 | 8/1980 | European Pat. Off. . |
| 728591 | 12/1942 | Fed. Rep. of Germany . |
| 2154942 | 5/1973 | Fed. Rep. of Germany ...... 534/642 |
| 457679 | 12/1936 | United Kingdom . |
| 457679 | 12/1936 | United Kingdom . |
| 498879 | 1/1939 | United Kingdom . |
| 587467 | 4/1947 | United Kingdom ................ 534/642 |
| 660196 | 10/1951 | United Kingdom . |
| 868474 | 5/1961 | United Kingdom . |
| 901692 | 7/1962 | United Kingdom . |
| 1033901 | 6/1966 | United Kingdom . |
| 1419330 | 12/1975 | United Kingdom . |
| 2003909 | 3/1979 | United Kingdom . |
| 2005294 | 4/1979 | United Kingdom ................ 534/845 |
| 2021619 | 12/1979 | United Kingdom . |

OTHER PUBLICATIONS

Peter, Grundlagen der Textilveredlung, 1985, pp. 146–147.
Fratman, Dyeing and Chemical Technology of Textile Fibres, 5th Ed., 1975, pp. 616–619.
Venkataraman, The Chemistry of Synthetic Dyes, vol. VIII, pp. 313–314 (1952), vol. I, p. 270 (1952).

Primary Examiner—Carolyn Elmore
Attorney, Agent, or Firm—Wenderoth, Lind & Ponack

[57] ABSTRACT

The present invention relates to azo dyes of the formula

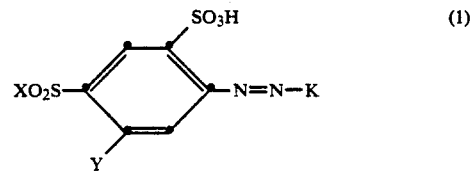

wherein X is an aryloxy radical or an unsubstituted or substituted $C_1$-$C_{12}$alkyl radical, a cycloalkyl radical or an aryl radical or a group of the formula

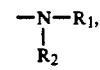

wherein $R_1$ is hydrogen, unsubstituted or substituted lower alkyl, cycloalkyl or aryl, and $R_2$ is hydrogen or unsubstituted or substituted lower alkyl, or wherein $R_1$ and $R_2$, together with the nitrogen atom to which they are attached, form a 5- or 6-membered heterocyclic ring which may contain a further hetero-atom, Y is halogen, low molecular alkyl or low molecular alkoxy, and K is the radical of a coupling component of the benzene or naphthalene series or of the heterocyclic series.

These dyes yield dyeings of good light- and wetfastness on polyamide material.

2 Claims, No Drawings

AZO DYES AND THE PRODUCTION AND USE THEREOF

This application is a continuation of now abandoned application Ser. No. 014,130 filed Feb. 4, 1987, which is a continuation of now abandoned application Ser. No. 828,610 filed Feb. 12, 1986, which is a continuation of now abandoned application Ser. No. 246,340 filed Mar. 23, 1981.

The present invention relates to azo dyes of the formula

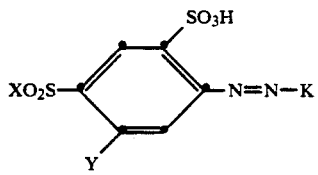

(1)

wherein X is an aryloxy radical or an unsubstituted or substituted $C_1$–$C_{12}$alkyl radical, a cycloalkyl radical or an aryl radical or a group of the formula

wherein $R_1$ is hydrogen, unsubstituted or substituted lower alkyl, cycloalkyl or aryl, and $R_2$ is hydrogen or unsubstituted or substituted lower alkyl, or wherein $R_1$ and $R_2$, together with the nitrogen atom to which they are attached, form a 5- or 6-membered heterocyclic ring which may contain a further hetero-atom, Y is halogen, low molecular alkyl or low molecular alkoxy, and K is the radical of a coupling component of the benzene or naphthalene series or of the heterocyclic series.

X as an aryloxy radical is preferably a phenoxy or naphthoxy radical, or a phenoxy or naphthoxy radical which can be substituted by low molecular alkyl or alkoxy, preferably methyl or methoxy, or by halogen.

Throughout this specification, the term "low molecular" or "lower" always denotes radicals containing 1 to 4 carbon atoms.

X as an unsubstituted or substituted alkyl radical can be a lower alkyl radical which may be substituted by halogen atoms, preferably chlorine, or by hydroxyl, sulfato, lower alkoxy or aryl groups, especially the phenyl group. Examples of such alkyl radicals are: methyl, chloromethyl, ethyl, β-hydroxyethyl, β-sulfatoethyl, β-ethoxyethyl or benzyl. X as a cycloalkyl or an aryl radical is preferably the cyclohexyl or phenyl group, or in that case a phenyl group substituted by halogen such as chlorine or bromine, or by nitro, methyl or methoxy.

X as an unsubstituted or substituted alkyl radical is preferably a lower alkyl radical which can be substituted by hydroxyl or phenyl.

If X is the

group, $R_2$ is preferably hydrogen or an unsubstituted or substituted lower alkyl radical and $R_1$ is preferably hydrogen or an unsubstituted or substituted lower alkyl, cycloalkyl or aryl radical, or $R_1$ and $R_2$, together with the nitrogen atom to which they are attached, form a non-aromatic 5- or 6-membered heterocyclic ring which may contain a further hetero-atom.

Unsubstituted or substituted alkyl radicals $R_1$ and $R_2$ are straight-chain or branched and can contain, as substitutents, in particular the hydroxyl, sulfo, sulfato, cyano, or lower alkoxy group or the aryl group such as the phenyl group, or halogen atoms such as chlorine or bromine. Examples of such alkyl radicals are: methyl, ethyl, isopropyl, tert-butyl, β-hydroxyethyl, β- or γ-hydroxypropyl, β-cyanoethyl, β-methoxyethyl, β-ethoxyethyl, benzyl, phenethyl, chloromethyl, β-chloroethyl or β-bromoethyl.

A cycloalkyl radical $R_1$ can be e.g. cycloalkyl containing preferably 5- or 6-membered heterocyclic rings, in particular the cyclohexyl group.

An aryl radical $R_1$ preferably belongs to the benzene series and can contain the customary ring substituents of azo dyes. Examples of such substituents, particularly at the phenyl radical, are sulfo, halogen such as fluorine, chlorine or bromine, lower alkyl groups such as methyl, lower alkoxy groups such as methoxy, or the carboxyl group.

The radical of a non-aromatic 5- or 6-membered heterocyclic ring formed by $R_1$ and $R_2$ together with the nitrogen atom to which they are attached, which ring may contain a further hetero-atom, is preferably the pyrrolidino, piperidino or morpholino group.

Preferably $R_2$ is hydrogen or lower alkyl and $R_1$ is hydrogen, lower alkyl, cyclohexyl, or phenyl which can be substituted by halogen or carboxyl, or $R_1$ and $R_2$, together with the nitrogen atom to which they are attached, are a morpholino group.

Y is preferably fluorine, chlorine, bromine, methyl or methoxy, with chlorine being most preferred.

The coupling component K is, in particular, the radical of a mono- or diaminobenzene, mono- or dialkoxybenzene, aminonaphthalene, naphthol, aminonaphthol, pyrazolone, aminopyrazole, pyridone, indole or pyrimidine. The amino group of the aminonaphthols can also be acylated, alkylated or arylated. Preferably K is e.g. the radical of a N-mono- or N,N-dialkylaminobenzene, the alkyl moieties of which can be unsubstituted or substituted, which radical can be further substituted in the benzene ring e.g. by methyl, methoxy, ethoxy, methylamino, ethylamino, acetylamino, benzoylamino and halogen.

Preferred azo dyes are those of the formula (1), wherein K is the radical of a N-mono- or N,N-di-($C_1$–$C_4$) alkylaniline, the $C_1$–$C_4$alkyl moieties of which can be substituted by chlorine, cyano, hydroxyl, phenyl, sulfophenyl, phenoxy, anilino, acetyloxy or sulfo, which radical can be substituted in the benzene nucleus by methyl, benzoylamino, acetylamino and chlorine, or wherein K is the radical of an aminonaphthalene, 1-ethyl-6-hydroxy-4-methyl-pyrid-2-one, 2-methylindole, 1-phenyl-3-methyl-pyrazol-5-one, methoxybenzene, 1-phenyl-3-methylaminopyrazole, 2,4,6-triaminopyrimidine or of a 3-methyl- or 3-methoxyaniline, X is a phenoxy radical which can be substituted by chlorine, methyl or methoxy, a naphthoxy radical, a methyl or ethyl radical which can be substituted by hydroxy or phenyl, or a group of the formula

wherein $R_2$ is hydrogen or $C_1$-$C_4$alkyl, and $R_1$ is hydrogen, $C_1$-$C_4$alkyl, cyclohexyl, or phenyl which can be substituted by chlorine or carboxyl, or wherein $R_1$ and $R_2$, together with the nitrogen atom to which they are attached, are a morpholino radical, and Y is fluorine, chlorine, bromine, methyl or methoxy.

Particularly preferred azo dyes are those of the formula (1), wherein K is the radical of a N,N-diethylaniline which is substituted in the benzene nucleus by methyl or acetylamino, X is —$NH_2$, a dimethylamino or phenoxy radical, and Y is chlorine.

Especially valuable azo dyes belonging to the group of these preferred azo dyes are those of the formula

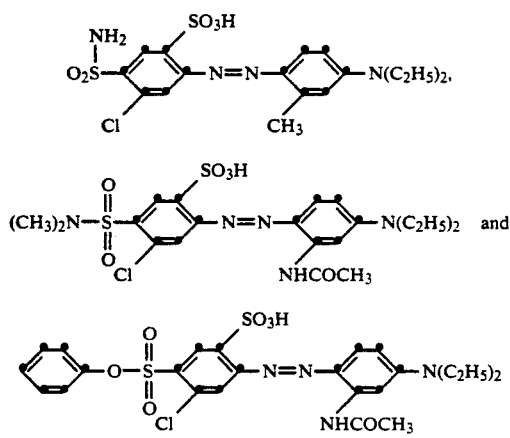

The azo dyes of the formula (1) can contain a fibre-reactive radical in the coupling component. In particular, K is a radical of the benzene or naphthalene series which contains a fibre-reactive radical.

Acyl radicals referred to as fibre-reactive are those which contain one or more reactive groups or removable substituents in the molecule which are able to react e.g. with cellulosic materials in the presence of acid acceptors, and, with or without the action of heat, with the hydroxyl groups or cellulose, or with synthetic or natural polyamide fibres such as wool, with the amino groups of these fibres, to form covalent bonds. A great number of such fibre-reactive groupings are known from the literature.

Especially preferred fibre-reactive azo dyes of the formula (1) are those in which X is a phenoxy or naphthoxy radical which can be substituted by halogen, $C_1$-$C_4$alkoxy or $C_1$-$C_4$alkyl, a $C_1$-$C_4$alkyl radical which can be substituted by hydroxyl or phenyl, or a group of the formula

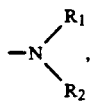

wherein $R_1$ is hydrogen, $C_1$-$C_4$alkyl, cyclohexyl, or phenyl which can be substituted by halogen or carboxyl, and $R_2$ is hydrogen or $C_1$-$C_4$alkyl, or wherein $R_1$ and $R_2$, together with the nitrogen atom to which they are attached, are a morpholino radical, Y is fluorine, chlorine, bromine, methyl or methoxy, and K is the radical of a N,N-di-($C_1$-$C_4$)alkylaniline, the alkyl moieties of which can be substituted by cyano, which radical can be substituted in the benzene nucleus by methyl, and wherein the fibre-reactive radical is attached via a

bridge, wherein $R_3$ is hydrogen or $C_1$-$C_4$alkyl, to the aromatic nucleus or to a carbon atom of the N,N-di($C_1$-$C_4$)alkyl group, or wherein the fibre-reactive radical is attached via an oxygen atom to a carbon atom of the di($C_1$-$C_4$)alkyl group, or wherein K is the radical of a coupling component of the formula

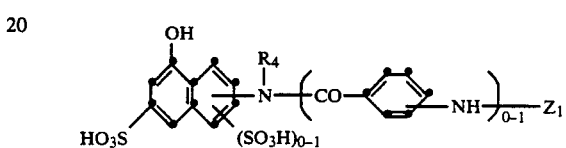

wherein $R_4$ is hydrogen or $C_1$-$C_4$alkyl and $Z_1$ is a fibre-reactive radical.

The particularly preferred azo dyes described above contain, as fibre-reactive radical, an α,β-dibromopropionyl, 2,6-difluoro-5-chloropyrimidyl, 2-chloro- or 2-fluoro-4-($C_1$-$C_4$)alkoxy-or —$C_1$-$C_2$alkoxy-$C_1$-$C_2$alkoxy-1,3,5-triazinyl group or a 2-chloro-4-phenylamino- or N—$C_1$-$C_4$alkylphenylamino-1,3,5-triazinyl group. Preferably X is phenoxy, —$NH_2$ or dimethylamino, and Y is fluorine, chlorine or methyl.

The dyes of this invention are obtained by diazotising a diazo component of the formula

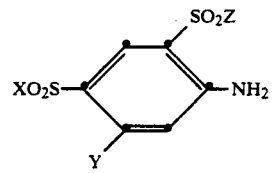

wherein Z is —$NH_2$— or OH, and coupling to a coupling component of the formula

and, if desired, introducing a fibre-reactive radical. The coupling is carried out by methods which are known per se. If desired or necessary, further reactions can follow the coupling. For example, a free amino group which may be present in the radical K can be diazotised after the coupling and a disazo dye obtained by coupling the diazo component to any coupling component H—K'. Treatment of a free amino group in the radical K, before or after the coupling, with a dicarboxylic acid chloride, e.g. phosgene, affords symmetrical disazo dyes. Further, a free amino group in the radical K can be converted, after the coupling, with an acylating or alkylating agent, into an acylamino or alkylamino group, and likewise a hydroxyl group in the radical K can be converted by alkylation into an alkoxy group.

If the substituent X in the diazo component is a NH₂ group, this latter can be reacted, after the coupling, with an alkylating agent.

The radical K is, in particular, the radical of a mono- or diaminobenzene, mono- or dialkoxybenzene, aminonaphthalene, naphthol, aminonaphthol, pyrazolone, aminopyrazole, pyridone, indole or pyrimidine. The amino group of the aminonaphthols can also be acylated, alkylated or arylated. It is preferred to start from coupling components in which K is the radical of a N-mono- or N,N-dialkylaminobenzene, the alkyl moieties of which are unsubstituted or substituted, which radical can be further substituted in the benzene ring, e.g. by methyl, methoxy, ethoxy, methylamino, ethylamino, benzoylamino, halogen or acetylamino, or in which K is the radical of an aminonaphtholsulfonic acid to which coupling can be effected twice, of an aminonaphthalene, pyridone, pyrimidine, indole, aminopyrazole, or of a 1-aryl-3-methylpyrazol-5-one. Such coupling components are listed in Swiss patent 564 121.

These radicals K can contain the customary substituents of azo dyes, e.g. $C_1$–$C_4$alkyl, $C_1$–$C_4$alkoxy, SO₃H, OH, NH₂, lower alkylamino or dialkylamino, acylamino, e.g. $C_1$–$C_4$alkanoylamino or $C_1$–$C_4$alkoxycarbonylamino or benzoylamino, halogen or a fibre-reactive radical.

The preferred azo dyes of the formula (1) are obtained by diazotising a diazo component of the formula (2), wherein X is a phenoxy or naphthoxy radical which can be substituted by halogen, $C_1$–$C_4$alkoxy or $C_1$–$C_4$alkyl, which phenoxy radical can in particular be substituted by chlorine, methyl or methoxy, and the naphthoxy radical is unsubstituted, or wherein X is a $C_1$–$C_4$alkyl radical which can be substituted by hydroxyl or phenyl, and X is preferably a methyl or ethyl radical, or wherein X is a group of the formula

wherein R₂ is hydrogen or $C_1$–$C_4$alkyl and R₁ is hydrogen, $C_1$–$C_4$alkyl, cyclohexyl or phenyl, which can be substituted by halogen, preferably chlorine, or carboxyl, or wherein R₁ and R₂, together with the nitrogen atom to which they are attached, are a morpholino radical, and Y is fluorine, chlorine, bromine or methoxy, and coupling the diazonium compound to a coupling component of the formula (3), wherein K is the radical of a N-mono- or N,N-di($C_1$–$C_4$)alkylaniline, the $C_1$–$C_4$alkyl moieties of which can be substituted by chlorine, cyano, hydroxyl, phenyl, sulfophenyl, phenoxy, anilino, acetyloxy or sulfo, which radical can be substituted in the benzene nucleus by methyl, benzoylamino, acetylamino and chlorine, or wherein K is the radical of an aminonaphthalene, 1-ethyl-6-hydroxy-4-methylpyrid-2-one, 2-methylindole, 1-phenyl-3-methylpyrazol-5-one, methoxybenzene, 1-phenyl-3-methylaminopyrazole, 2,4,6-triaminopyrimidine or of a 3-methyl- or 3-methoxyaniline.

It is preferred to use diazo components of the formula (2), wherein X is NH₂, a dimethylamino or phenoxy radical and Y is chlorine, and to couple them, after diazotisation, to 3-methyl- or 3-acetylamino-N,N-diethylaniline.

Particularly valuable azo dyes are obtained by diazotising 5-chloroaniline-2,4-disulfamide and coupling the diazo compound to N,N-diethyl-m-toluidine, or by diazotising 5-chloroaniline-4-dimethylsulfonamide-2-sulfonic acid and coupling the diazo compound to 3-diethylaminoacetanilide, or by diazotising 5-chloro-4-phenoxysulfonylaniline-2-sulfonic acid and coupling the diazo compound to 3-diethylaminoacetanilide.

If the coupling component contains an acylatable amino or hydroxyl group, or a group which can be converted into such a group, this can be reacted, before or after the coupling, with an acylating agent, preferably with one that donates fibre-reactive acyl groups.

Suitable fibre-reactive groups are, for example, those of the aliphatic series, such as acryloyl, mono-, di- or trichloro- or mono-, di- or tribromoacryloyl or -metacryloyl, such as —CO—CH=CH—Cl, —CO—CCl=CH₂, —CO—CH=CHBr, —COCBr=CH₂, —CO—CBr=CHBr, —CO—CCl=CH—CH₃, —CO—CCl=CH—COOH, —CO—CH=CCl—COOH, 4-chloropropionyl, 3-phenylsulfonylpropionyl, 3-methylsulfonylpropionyl, β-sulfatoethylaminosulfonyl, vinylsulfonyl, β-chloroethylsulfonyl, β-sulfatoethylsulfonyl, β-methylsulfonylethylsulfonyl, β-phenylsulfonylethylsulfonyl, 2-fluoro-2-chloro-3,3-difluorocyclobutane-1-carbonyl, 2,2,3,3-tetrafluorocyclobutanecarbonyl-1 or -sulfonyl-1, β-(2,2,3,3-tetrafluorocyclobutyl-1)-acryloyl, α-or β-alkyl- or -arylsulfonylacryloyl, such as α- or β-methylsulfonylacryloyl.

Reactive radicals which are particularly suitable for polyamide and wool are: chloroacetyl, bromoacetyl, α,β-dichloro- or α,β-dibromopropionyl, α-chloro- or α-bromoacryloyl, 2,4-difluoro-5-chloropyrimidyl-6, 2,4,6-trifluoropyrimidyl-5, 2,4-dichloro-5-methylsulfonylpyrimidyl-6, 2,4-difluoro-5-methylsulfonylpyrimidyl-6, 2,4-difluorotriazinyl-6, as well as fluorotriazinyl radicals of the formula

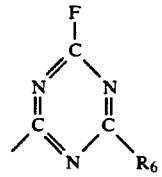

wherein R₆ is an unsubstituted or substituted amino group or a free or etherified oxy or thio group, e.g. the NH₂ group, an amino group which is mono- or disubstituted by $C_1$–$C_4$alkyl radicals, a $C_1$–$C_4$alkoxy group, a $C_1$–$C_4$alkylmercapto group, arylamino, especially phenylamino, or phenylamino which is substituted by methyl, methoxy, chlorine and, in particular, sulfo, or phenoxy, mono- or disulfophenyloxy etc., as well as the corresponding chlorotriazinyl radicals.

Examples of starting materials for introducing such triazine radicals are: 2,4-difluoro- or 2,4-dichloro-6-aminotriazine, 2,4-difluoro- or 2,4-dichloro-6-methylaminotriazine, 2,4-difluoro- or 2,4-dichloro-6-ethylaminotriazine, 2,4-difluoro- or 2,4-dichloro-6-phenylaminotriazine, 2,4-difluoro- or 2,4-dichloro-6-(2',3'- or 4'-sulfophenyl)-aminotriazine, 2,4-difluoro- or 2,4-dichloro-6-(2',4'- or 3',4'- or 2',5'- or 4',5'-disulfophenyl)-aminotriazine, 2,4-difluoro- or 2,4-dichloro-6-dimethylaminotriazine, 2,4-difluoro- or 2,4-dichloro-6-methoxytriazine, 2,4-difluoro- or 2,4-dichloro-6-(β-methoxyethoxy)-triazine, 2,4-difluoro- or 2,4-dichloro- 6-methylmercaptotriazine and 2,4-difluoro- or 2,4-dichloro-6-phenylmercaptotriazine.

The azo dyes of the formula (1) which contain a fibre-reactive radical are obtained by reacting a diazo component of the formula (2), a coupling component of the formula (3) which contains an acylatable amino or hydroxyl group, and an acylating agent which contains a fibre-reactive radical, in any order, with one another.

It is preferred to use as coupling components which contain an acylatable group those of the benzene or naphthalene series.

It is preferred to use diazo components of the formula (2), wherein X is a phenoxy or naphthoxy radical which can be substituted by halogen, $C_1$–$C_4$alkoxy or $C_1$–$C_4$alkyl, or is a $C_1$–$C_4$alkyl radical which can be substituted by hydroxyl or phenyl, or is a group of the formula

wherein $R_1$ is hydrogen, $C_1$–$C_4$alkyl, cyclohexyl, or phenyl which can be substituted by halogen or carboxyl, and $R_2$ is hydrogen or $C_1$–$C_4$alkyl, or wherein $R_1$ and $R_2$, together with the nitrogen atom to which they are attached, are a morpholino radical, Y is fluorine, chlorine, bromine, methyl or methoxy, and Z is as defined for formula (2).

It is preferred to use coupling components of the formula (3), wherein K is the radical of a N,N-di($C_1$–$C_4$)-alkylaniline, the alkyl moieties of which can be substituted by cyano, which radical can be substituted in the benzene ring by methyl, and wherein a

radical is attached to an aromatic nucleus or to a carbon atom of the N,N-di($C_1$–$C_4$)alkyl moiety, in which radical $R_3$ is hydrogen or $C_1$–$C_4$alkyl and acyl is a fibre-reactive radical, or wherein an O-acyl radical is attached to a carbon atom of the N,N-di($C_1$–$C_4$)alkyl moiety, in which radical acyl is a fibre-reactive radical.

Preferred coupling components are also those of the formula

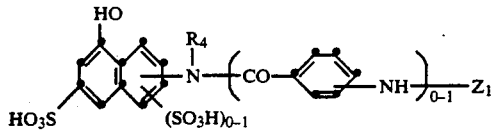

wherein $R_4$ is hydrogen or $C_1$–$C_4$alkyl and $Z_1$ is a fibre-reactive acyl radical.

The fibre-reactive radical bound to the preferred coupling components of the formula (3) is preferably an α,β-dibromopropionyl, 2,6-difluoro-5-chloropyrimidyl, 2-chloro- or 2-fluoro-4-$C_1$–$C_4$alkoxy- or —$C_1$–$C_2$alkoxy-$C_1$–$C_2$-alkoxy-1,3,5-triazinyl radical or a 2-chloro-4-phenylamino- or —N—$C_1$–$C_4$alkylphenylamino-1,3,5-triazinyl radical.

The most preferred diazo components of the formula (2) as starting materials are those in which X is phenoxy, —$NH_2$ or dimethylamino, and Y is fluorine, chlorine or methyl.

Particularly preferred reactive radicals are the α-bromoacryloylamino group and the α,β-dibromopropionylamino group. The former can either be introduced with bromoacryloyl chloride or obtained from the α,β-dibromopropionyl group by dehydrobromination. The same also applies to the α-chloroacryloyl group. Also of interest are the 4,6-difluorotriazin-2-yl group or the 4-fluoro- or 4-chloro-6-alkyl- or -6-arylaminotriazin-2-yl groups.

Representative examples of coupling components of the formula (3) are: dimethylaniline, diethylaniline, 3-methyldimethylaniline, 3-methyl-diethylaniline, 3-acetylamino- or 3-methoxycarbonylamino- or 3-ureido-dimethylaniline, 3-methyl-6-methoxy-diethylaniline, 2,5-dimethoxydiethylaniline, N-ethyl-N-benzylaniline, N-ethyl-N-(β-cyanoethyl)aniline, N-ethyl-N-(β-hydroxyethyl)aniline, N-ethyl-N-(β-acetoxyethyl)aniline, N,N-dibutylaniline, 3-(α,β-dibromopropionylamino)-N,N-dimethyl-or diethylaniline, 3-(α-chloroacetylamino)- or 3-(α-bromoacryloylamino)-N,N-dimethylaniline, 1-hydroxy-7-amino-3-sulfonaphthalene, 1-hydroxy-7-methylamino- or -7-phenylamino-3-sulfonaphthalene, 1-hydroxy-7-(α,β-dibromopropionylamino)-or 7-(α-chloroacetylamino)-3-sulfonaphthalene, 1-hydroxy-8-amino-3,6- or -3,5-disulfonaphthalene, 1-hydroxy-8-benzoylamino-3,6- or -3,5-disulfonaphthalene, 1-hydroxy-8-ureido-3,6- or -3,5-disulfonaphthalene, 1-hydroxy-8-acetylamino-3,6-or -3,5-disulfonaphthalene, 1-hydroxy-8-(3'-α,β-dibromopropionylaminobenzoylamino)-3,6-or -3,5-disulfonaphthalene, 1-(2',3'- or 4'-sulfophenyl)-3-methylpyrazol-5-one, 1-(2'-chloro-4'- or 5'-sulfophenyl)-3-methylpyrazol-5-one, 1-(2'-methyl-4'-sulfophenyl)-3-methylpyrazol-5-one, 1-[4',8'-disulfonaphthyl-(2)]-3-methylpyrazol-5-one, 1-[5',7'-disulfonaphthyl-(2)]-3-methylpyrazol-5-one, 1-(2'-chloro-5'-sulfophenyl)-3-methyl-5-aminopyrazole, 1-(2'-chloro-4'-sulfophenyl)-3-methyl-5-aminopyrazole, 1-(3'- or 4'-sulfophenyl)-3-methyl-5-aminopyrazole, 1-ethyl-3-cyano-4-methyl-6-hydroxypyrid-2-one, 1-ethyl-4-methyl-6-hydroxypyrid-2-one, 2-methylindole, 2-phenylindole.

The present invention also relates to the compounds used as diazo components of the formula

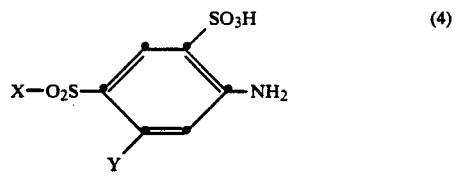

wherein X and Y are as defined for formula (2). They are obtained by diazotisation and saponification of a corresponding disulfamide as illustrated in Example 1, and subsequent reductive cleavage of the azo dye if it is desired to isolate the diazo component, or as described in more detail hereinafter.

Representative examples of compounds of the formulae (2) and (4) are: 1-amino-3-chloro-4-aminosulfonylbenzene-6-sulfonic acid, 1-amino-3-bromo-4-aminosulfonylbenzene-6-sulfonic acid, 1-amino-3-methoxy-4-aminosulfonylbenzene-6-sulfonic acid, 1-amino-3-chloro-4,6-diaminosulfonylbenzene, 1-amino-3-bromo-4,6-diaminosulfonylbenzene, 1-amino-3-methoxy-4,6-diaminosulfonylbenzene, 1-amino-3-chloro-4-N-methylaminosulfonylbenzene-6-sulfonic acid, 1-amino-3-chloro-4-N-ethylaminosulfonylbenzene-6-sulfonic acid, 1-amino-3-bromo-4-N-methylaminosulfonylbenzene-6-sulfonic acid, 1-amino-3-bromo-4-N-ethylaminosulfonylbenzene-6-sulfonic acid, 1-amino-3-methoxy-4-N-methylaminosulfonylbenzene-6-sulfonic acid, 1-amino-3-methoxy-4-N-ethylaminosulfonylbenzene-6-sulfonic acid, 1-amino-3-chloro-4-N-methylaminosulfonyl-6-aminosulfonylbenzene, 1-amino-3-chloro-4-N-ethylaminosulfonyl-6-aminosulfonylbenzene, 1-amino-3-bromo-4-N-methylaminosulfonyl-6-aminosulfonylbenzene, 1-amino-3-bromo-4-N-ethylaminosulfonyl-6-aminosulfonylbenzene, 1-amino-3-methoxy-4-N-methylaminosulfonyl-6-aminosulfonylbenzene, 1-amino-3-methoxy-4-N-ethylaminosulfonyl-6-aminosulfonylbenzene, 1-amino-3-chloro(bromo,methoxy)-4-N,N-dimethylamino(N,N-diethylamino, N-methyl-N-ethylamino, morpholino, N-methyl-N-cyclohexylamino)sulfonylbenzene-6-sulfonic acid, 1-amino-3-chloro(bromo,methoxy)-4-N,N-dimethylamino(N,N-diethylamino, N-methyl-N-ethylamino, morpholino, N-methyl-N-cyclohexylamino)sulfonyl-6-aminosulfonylbenzene, 1-amino-3-chloro(bromo,methoxy)-4-phenoxy(o-chlorophenoxy,m-sulfophenoxy)-sulfonylbenzene-6-sulfonic acid, 1-amino-3-chloro(-bromo,methoxy)-4-phenoxy(o-chlorophenoxy,m-sulfophenoxy)sulfonyl-6-aminosulfonylbenzene, 1-amino-3-chloro(bromo,methoxy)-4-methyl(ethyl,-benzyl)sulfonylbenzene-6-sulfonic acid, 1-amino-3-chloro(bromo,-methoxy)-4-methyl(ethyl,benzyl)sulfonyl-6-aminosulfonylbenzene, 1-amino-3-fluoro(methyl)-4-N,N-dimethylaminosulfonylbenzene-6-sulfonic acid, 1-amino-3-fluoro(methyl)-4-phenoxysulfonylbenzene-6-sulfonic acid, 1-amino-3-fluoro(methyl)-4-p-methoxyphenoxy(p-chlorophenoxy,o-methylphenoxy)sulfonylbenzene-6-sulfonic acid, 1-amino-3-fluoro(methyl)-4-naphthoxysulfonylbenzene-6-sulfonic acid, 1-amino-3-fluoro(methyl)-4-methyl($\beta$-hydroxyethyl,benzyl)sulfonylbenzene-6-sulfonic acid.

Particularly interesting compounds of the formula (4) are those in which Y is fluorine, chlorine, bromine, methyl or methoxy.

The compounds of the formula (4) are obtained by reacting a compound of the formula

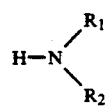

(5)

wherein $R_5$ is an acyl radical, especially an acetyl radical, and Y is as defined for formula (4), with chlorosulfonic acid, reacting the sulfochloride obtained, in order to introduce the radical X, if desired after reduction of the sulfochloride to sulfinic acid, with a hydroxyaryl compound, a $C_1$–$C_{12}$alkylating agent, a cycloalkylating agent or arylating agent or with a compound of the formula

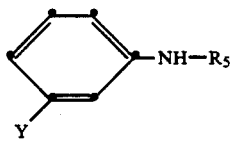

wherein $R_1$ and $R_2$ are as defined for formula (1), and saponifying the resultant compound of the formula

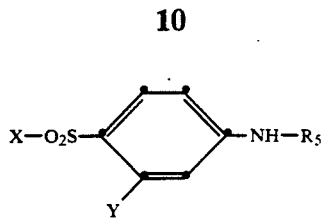

to remove the acyl radical $R_5$, and then reacting it with chlorosulfonic acid to give a compound of the formula (4).

The novel dyes are suitable for dyeing and printing materials which contain hydroxyl or amide groups, such as textile fibres, textile filaments and wovens made from wool, silk, polyurethane and cellulose, and especially for dyeing and printing synthetic polyamide, using conventional dyeing methods. The dyes have brilliance and colour strength, good migration, exhaust and build-up properties, resistance to formaldehyde, excellent lightfastness as well as good solubility and good general fastness properties such as fastness to rubbing, acid and alkali, and wetfastness, especially fastness to washing, water, hot water, perspiration and fulling, and they give level dyeings.

The invention is illustrated by the following Examples, in which parts are by weight. The relationship between parts by weight and parts by volume is the same as that between the gram and the cubic centimeter.

EXAMPLE 1

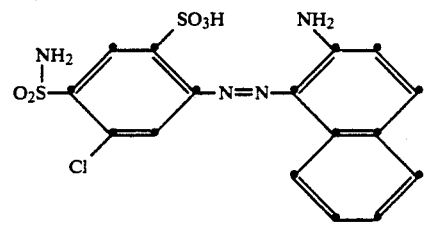

Diazotisation 5.71 parts (0.02 mole) of 5-chloroaniline-2,4-disulfamide are added to 20 parts by volume of sulfolane and dissolved by heating to 50°–60° C. and adding 25 parts of water. Then 5 parts by volume of conc. hydrochloric acid are added to the solution, which is cooled to 2° C. Diazotisation is carried out at 2°–4° C. with 10 parts by volume of 4N sodium nitrite solution (0.04 mole)*. After some time, a small excess of nitrite is destroyed with sulfamic acid.

*) It has been found that the diazotisation of 5-chloroaniline-2,4-disulfamide using 2 equivalents of nitrite and "saponification" of a sulfamide group proceeds in accordance with the following scheme:

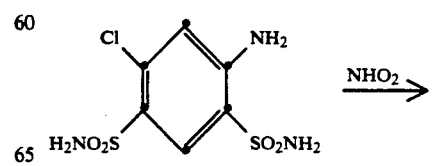

I

-continued

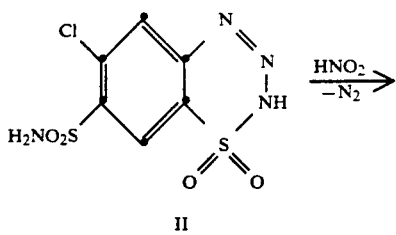

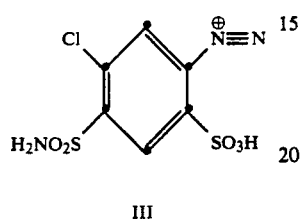

The intermediate II is unstable and is converted into the diazonium salt III with evolution of $N_2$ and uptake of further nitrite. A sulfo group is formed from the sulfamide group in the ortho-position to the amino group. The position of the sulfo group in the ortho-position to the amino group is confirmed by NMR and IR spectroscopy.

Coupling 4.46 parts (0.02 mole) of 2-aminonaphthalene-1-sulfonic acid are dissolved in 50 parts of water of room temperature with sodium hydroxide at pH 7–8, and the solution is poured into the above prepared suspension of the diazonium salt. When the coupling is complete, the coupling mixture is filtered and the filter cake is washed with water. The filter cake is then stirred into 100 parts of water and dissolved by adding sodium hydroxide at pH 7 and a temperature of 50°–60° C. The dye is salted out from this solution and collected by filtration. The precipitate is washed with brine and dried, affording 8.4 parts of dye which colours natural or synthetic polyamide fabrics in red shades of excellent fastness to migration and very good lightfastness.

The structures of the diazo components of the formula (2) used in the succeeding Examples, or their precursors, were confirmed by NMR or IR spectroscopy.

EXAMPLE 2

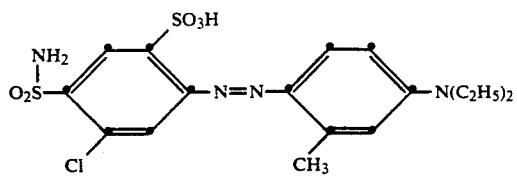

Diazotisation 5.71 parts of 5-chloroaniline-2,4-disulfamide (0.02 mole) are diazotised as described in Example 1.

Coupling 3.26 parts of N,N-diethyl-m-toluidine (0.02 mole) are dissolved in 50 parts of water of room temperature by adding 3 parts by volume of conc. hydrochloric acid, and the solution is added dropwise over 10 minutes to the above suspension of the diazonium salt. The coupling is allowed to go to completion at room temperature. The almost completely precipitated dye is isolated by filtration, washed with water and dried, affording 8.62 parts of the azo dye of the above formula, which dyes synthetic polyamide fabrics in red shades of good general fastness properties.

EXAMPLE 3

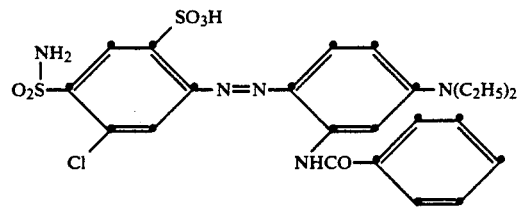

Diazotisation 5.71 parts (0.02 mole) of 5-chloroaniline-2,4-disulfamide are diazotised as described in Example 1.

Coupling 5.36 parts (0.02 mole) of 3-diethylaminobenzanilide are dissolved in 60 parts of water with 3 parts of conc. hydrochloric acid and the solution is added to the above suspension of the diazonium salt. The reaction mixture is stirred at room temperature until the coupling is complete. The dye is then isolated by filtration, washed with water and dried, affording 10.36 parts of an azo dye which dyes natural or synthetic polyamide fabrics in red shades and has good build-up.

EXAMPLE 4

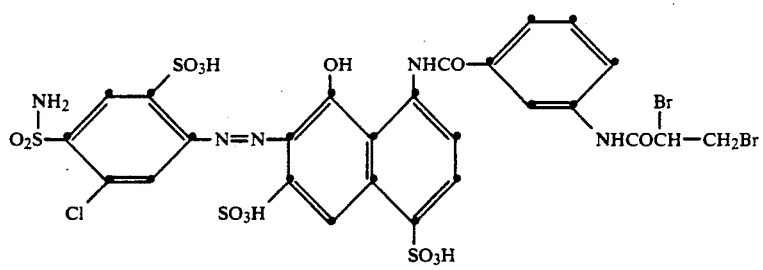

Diazotisation 5.71 parts of 5-chloroaniline-2,4-disulfamide are diazotised as described in Example 1.

Coupling 13.04 parts of 1-[3'-(α,β-dibromopropionylamino)-benzoyl]-8-hydroxynaphthalene-4,6-disulfonic acid in 100 parts of water are adjusted to pH 8 with sodium hydroxide and cooled to 2° C. While keeping a pH of 8, the above suspension of the diazonium salt is added over 15 minutes. When the coupling is complete the solution is concentrated. The resultant resin is extracted with alcohol, filtered off and dried, affording 27.2 parts of a dye which dyes wool in red shades of good light- and wetfastness.

EXAMPLE 5

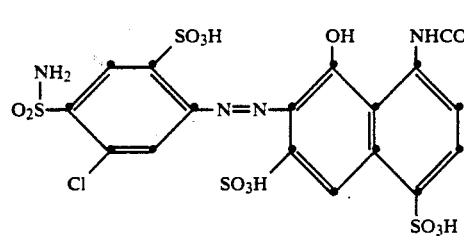

Diazotisation 5.71 parts of 5-chloroaniline-2,4-disulfamide are diazotised as described in Example 1.

Coupling 11.72 parts of 1-[3'-(2",4"-difluoro-5"-chloropyrimidine-6"-yl)-aminobenzoylamino]-8-hydroxynaphthalene-4,6-disulfonic acid in 200 parts of water are adjusted to pH 7 with sodium hydroxide at room temperature and then cooled to 2° C. The above suspension of the diazonium salt is then added in the course of 15 minutes and the coupling mixture is kept at pH 7 with sodium hydroxide. When the coupling is complete, the solution is concentrated to dryness and the resin obtained as residue is extracted with alcohol. The dye is then dissolved in a small amount of water, precipitated with potassium chloride and dried, affording 14.4 parts of dye which dyes cotton and wool in fast red shades.

EXAMPLE 6

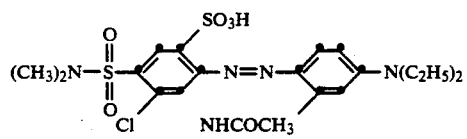

Diazotisation 3.15 parts (0.01 mole) of 5-chloroaniline-4-dimethylsulfamide-2-sulfonic acid are dissolved in 50 parts of water. After addition of 2 parts by volume of conc. hydrochloric acid, diazotisation is effected with 2.5 parts by volume of 4N sodium nitrite solution (0.01 mole) at 14°–16° C. When diazotisation is complete, a small excess of nitrite is destroyed with sulfamic acid.

Coupling 2.06 parts (0.01 mole) of 3-diethylaminoacetanilide are dissolved in 50 parts of water with 1.5 parts of conc. hydrochloric acid at room temperature and the solution is added dropwise to the above suspension of the diazonium salt. The coupling is allowed to go to completion at room temperature. The almost completely precipitated dye is isolated by filtration and washed with water. The filter cake is stirred in 100 parts of water and adjusted to pH 7 with sodium hydroxide. The dye is precipitated with sodium chloride, isolated by filtration, washed and dried, affording 5.12 parts of a red dye which yields on synthetic polyamide red dyeings of excellent fastness to light, migration and formaldehyde.

The diazo component, 5-chloroaniline-4-dimethylsulfamide-2-sulfonic acid, is prepared as follows:

169.5 parts of 3-chloroacetanilide are stirred into 332 parts by volume of chlorosulfonic acid. The mixture is stirred for 7 hours at 70° C. and then for 15 hours at 25° C., then poured onto 2500 parts of ice. The precipitated sulfochloride is isolated by filtration and washed with 1500 parts of ice-water. The residue is dissolved in 1700 parts by volume of chloroform at 25° C., with stirring. The water is then separated and the chloroform phase is washed with 500 parts by volume of distilled water, dried over sodium sulfate, filtered with 10 parts of activated charcoal, and evaporated to dryness at 15 mm Hg. Yield: 142 parts.

The moist paste of the sulfochloride obtained from a batch as described above is stirred with 500 parts by volume of toluene at 0° C. until homogeneous and then 384 parts by volume of dimethylamine are added in portions with efficient stirring. The suspension is stirred for 20 hours at 25° C. The aqueous phase is then separated from the toluene suspension. The toluene suspension is dissolved by adding 300 parts by volume of methylene chloride and washed successively with 200 parts by volume of water and 600 parts by volume of 0.1N hydrochloric acid. The clear organic solution is dried over sodium sulfate and evaporated to dryness in vacuo. The residue is an opaque resin, which is added, without further purification, to 1200 parts of 2N sodium hydroxide and the batch is heated for 30 minutes to gentle reflux. The suspension is cooled to 70° C. and filtered. The coarse crystalline residue is comminuted in a mixer in 500 parts of water, filtered, and washed with 500 parts of water. The residue is then dried in vacuo at 70°-80° C., affording 93.5 parts of a compound of the formula

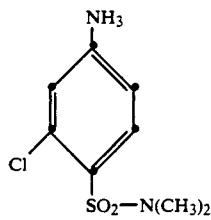

with a melting point of 123°-127° C.

58 parts of the compound of the above formula are stirred in 500 parts by volume of tetrachloroethane and is partly dissolved. Then 16.6 parts by volume of chlorosulfonic acid are added dropwise with stirring. The mixture is heated to 135° C. in the course of 90 minutes and then stirred for 2½ hours at the same temperature. The suspension is cooled to 100° C. and filtered. The residue is washed with 250 parts by bolume of chloroform and dried in vacuo at 50°-60° C., affording 77 parts of the compound of the formula

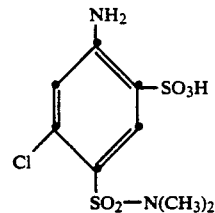

Valuable water-soluble dyes which dye polyamide in greenish-yellow to bluish-red shades of similarly good fastness properties are obtained by repeating the procedure of this Example, using the diazo components and coupling components listed in Table I.

TABLE I

| No. | Diazo component | Coupling component | Shade on polyamide |
|---|---|---|---|
| 1 | (NH$_2$, SO$_3$H, Cl, SO$_2$N(CH$_3$)$_2$ substituted benzene) | (CH$_3$, HO, N-C$_2$H$_5$, O pyridone) | greenish yellow |
| 2 | " | (CH$_3$, N-H indole) | yellow |
| 3 | " | (CH$_2$-C(=O), C(CH$_3$)=N, N-phenyl-Cl pyrazolone) | yellow |
| 4 | " | (N(C$_2$H$_5$)(CH$_2$CH$_2$Cl) aniline) | scarlet |

TABLE I-continued

| No. | Diazo component | Coupling component | Shade on polyamide |
|---|---|---|---|
| 5 | 4-chloro-2-amino-5-(N,N-dimethylsulfamoyl)benzenesulfonic acid (NH$_2$, SO$_3$H, Cl, SO$_2$N(CH$_3$)$_2$ on benzene) | phenyl–N(CH$_2$CH$_2$CN)$_2$ | reddish yellow |
| 6 | " | 3-methyl-N-ethyl-N-benzylaniline | yellowish red |
| 7 | " | [phenyl–N(C$_2$H$_5$)–CH$_2$–]$_2$ | |
| 8 | " | 2-chloro-4-acetamido-N-(2-hydroxy-3-phenoxypropyl)aniline (Cl, NHCOCH$_3$, NHCH$_2$CH(OH)CH$_2$O–phenyl) | orange |
| 9 | " | 3-chloro-N,N-dimethylaniline | reddish orange |
| 10 | " | N-ethyl-N-benzylaniline | scarlet |
| 11 | 4-chloro-2-amino-5-(N,N-dimethylsulfamoyl)benzenesulfonic acid (NH$_2$, SO$_3$H, Cl, SO$_2$N(CH$_3$)$_2$ on benzene) | N,N-diethylaniline | yellowish red |
| 12 | " | 3-methyl-N,N-diethylaniline | red |
| 13 | " | 2-methyl-4-acetamido-N,N-dimethylaniline | orange |

TABLE I-continued
| No. | Diazo component | Coupling component | Shade on polyamide |
|---|---|---|---|
| 14 | " | 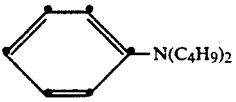 | yellowish red |
| 15 | 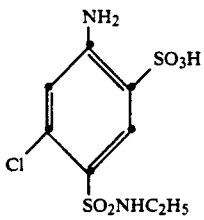 | 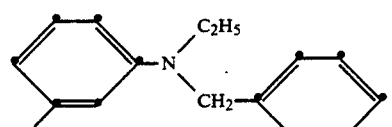 | scarlet |
| 16 | " | 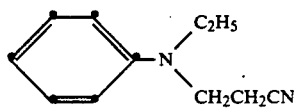 | reddish yellow |
| 17 | " | 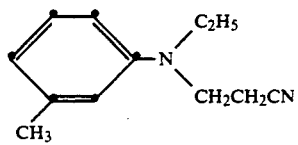 | orange |
| 18 | 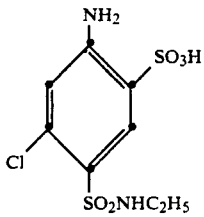 | 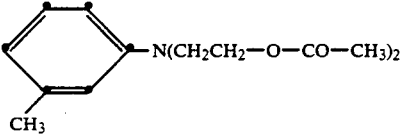 | red |
| 19 | 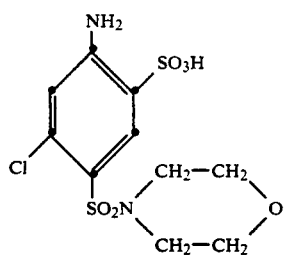 | 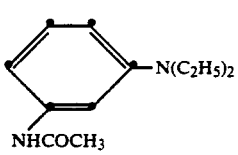 | red |
| 20 | " | 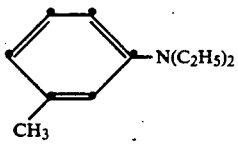 | red |
| 21 | 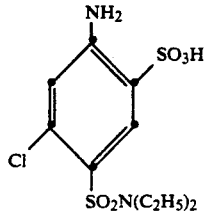 | " | red |

TABLE I-continued

| No. | Diazo component | Coupling component | Shade on polyamide |
|---|---|---|---|
| 22 | 2-amino-4-chloro-5-(N-methyl-N-phenyl-sulfamoyl)benzenesulfonic acid | N,N-diethyl-3-methylaniline | red |
| 23 | 2-amino-4-chloro-5-(N-phenylsulfamoyl)benzenesulfonic acid | N-ethyl-N-(2-hydroxyethyl)-3-methylaniline | red |
| 24 | 2-amino-4-chloro-5-[N-(4-chlorophenyl)sulfamoyl]benzenesulfonic acid | N,N-diethyl-3-methylaniline | red |
| 25 | 2-amino-4-chloro-5-[N-(4-carboxyphenyl)sulfamoyl]benzenesulfonic acid | " | red |

EXAMPLE 7

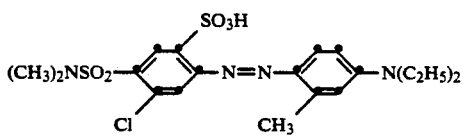

4.6 g of the dye obtained in Example 2 are stirred in 30 ml of dimethyl methanephosphonate and 4.2 g of sodium carbonate for several hours at 100°–120° C. until a chromatogram confirms that a homogeneous product has been obtained. Undissolved sodium carbonate is then removed by filtration and excess dimethyl methanophosphonate is distilled off in vacuo. The concentrated reaction mass is taken up in 100 ml of water and the dye is salted out with sodium chloride and collected by filtration. The filter cake is dried, affording e.re g of a red dye which is identical in structure with compound 10 of the Table and has the same dyeing properties.

EXAMPLE 8

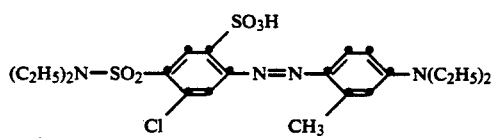

4.6 g of the dye obtained in Example 2 are dissolved in 100 ml of water at pH 11 and 60° C. The pH is kept constant with sodium hydroxide and diethyl sulfate is added dropwise until virtually no more educt can be detected in a chromatogram. A mixture of mono- and dialkylated sulfamide is obtained. The dye of the more reluctantly soluble diethyl sulfamide is isolated by filtration at room temperature and dried, affording 2.45 g of dye which dyes polyamide in red shades of good fastness properties.

EXAMPLE 9

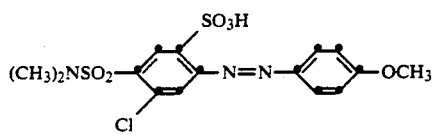

Diazotisation 5.71 g of 5-chloroaniline-2,4-sulfamide are diazotised as described in Example 1.

Coupling 3.94 g of phenol are dissolved in 100 ml of water with 20 ml of 2N sodium hydroxide and the solution is cooled to 2° C. The above suspension of the diazonium salt is added in portions while keeping the pH at 10 with NaOH and at 2°-5° C. The dye is salted out at pH 2.5 with potassium chloride, isolated by filtration and dried. Yield: 20 g of a yellow dye.

Alkylation 7.83 g of the above dye and 8.5 g of sodium carbonate in 60 ml of dimethyl methanephosphonate are stirred for several hours at 100°-120° C. After a homogeneous product has been obtained, undissolved sodium carbonate is removed by filtration and excess dimethyl methanephosphonate is distilled off in vacuo. The concentrated reaction mass is poured into 100 ml of water and the dye is salted out with sodium chloride, isolated by filtration and dried. Yield: 4.77 g of a dye of the above structure.

EXAMPLE 10

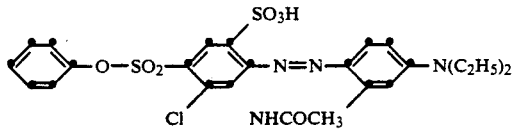

Preparation of the Diazo Component, 5-Chloro-4-phenoxysulfonylaniline-2-sulfonic Acid 53.6 g of dry 3-chloroacetylsulfanyl chloride (obtained as in Example 6) are dissolved in 250 ml of acetone and this solution is then added dropwise in the course of 1½ hours to a second solution of 22.56 g of phenol in 500 ml of water at room temperature, while keeping the pH at 9 with dilute NaOH. While keeping the pH value, stirring is continued until the acetone has evaporated, then the precipitated product is isolated by filtration and washed with water. The filter residue is stirred briefly in 100 ml of 1N NaOH and then filtered. The filter cake is washed with water and dried in vacuo, affording 51.25 g of 3-chloro-4-phenoxysulfonylacetanilide with a melting point of 129°-133° C.

50 g of the above compound are treated at reflux in 100 ml of glacial acetic acid, 150 ml of hydrochloric acid and 100 ml of water until the acetyl group has been completely saponified. The crystalline slurry is filtered at room temperature and the filter cake is washed with water. The filter cake is then dissolved in water and the solution is adjusted to pH 9 with a small amount of NaOH and filtered. The filter cake is dried at 50°-60° C., affording 30.4 g of 3-chloro-4-phenoxysulfonylaniline.

With vigorous stirring, 24.2 g of the above compound are dissolved in 170 ml of tetrachloroethane and then 5.65 ml of chlorosulfonic acid are added dropwise. The reaction mixture is heated and kept at reflux temperature until the evolution of HCl gas has ceased. The cooled reaction mass is diluted with 100 ml of chloroform, filtered, and the filter cake is washed with chloroform. The filter residue is taken up in 175 ml of water and, after adjusting the pH to 7 with NaOH, the turbid solution is extracted with three 100 ml portions of chloroform. The aqueous solution is acidified with hydrochloric acid and the product is salted out with potassium chloride, isolated by filtration and dried, affording 53.7 g of 5-chloro-4-phenoxysulfonylaniline-2-sulfonic acid.

Diazotisation and Coupling 7.27 g of the above diazo component are dissolved in 100 ml of hot water and, after addition of 5 ml of 10N hydrochloric acid and cooling to 14°-16° C., diazotisation is effected with 5 ml of 4N sodium nitrite. A small excess of nitrite is destroyed after 15 minutes with sulfamic acid. Then 4.68 g of 3-diethylaminoacetanilide are dissolved in 100 ml of water with 4 ml of 10N hydrochloric acid and the solution is added dropwise to the suspension of the diazonium salt. The mixture is stirred for 17 hours at 40°-50° C. and then adjusted to pH 3.5 with sodium acetate. The coupling product is collected by filtration and washed with water. The paste is then dissolved in 150 ml of water at 70° C. with 2N NaOH at pH 8. The dye is salted out with sodium chloride and collected by filtration. The filter cake is washed with brine and dried in vacuo at 60°-70° C., affording 11.43 g of a monoazo dye which yields a bluish red dyeing on polyamide from a weakly acid bath. The dye has excellent build-up, excellent resistance to formaldehyde, and good general fastness properties.

EXAMPLE 11

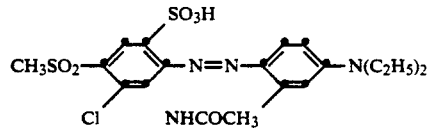

Preparation of 5-Chloroaniline-4-methylsulfone-2-sulfonic Acid (Diazo Component)

86.5 g of sodium sulfite are dissolved in 1000 ml of water, then 89 g of dry 3-chloroacetylsulfanilic acid chloride (obtained as described in Example 6) are added at 0°-5° C., while keeping the pH at 8 with 10N NaOH for about 20 hours at the same temperature. A small amount of resinous material is removed and then 50 ml of 10N hydrochloric acid are added to the solution and the batch is stirred for 2 hours at room temperature. The precipitated product is isolated by filtration, washed with ice-water and dried over $P_2O_5$ in vacuo, affording 62.9 g of 3-chloroacetanilide-4-sulfinic acid.

50 g of the above compound in 630 ml of dimethyl phosphonate, 210 ml of water and 89 g of sodium carbonate are brought to the boil, with stirring, and kept at reflux for 20 hours. The soludion is concentrated to a volume of 470 ml, then poured into 1000 ml of ice-water. The pH is adjusted with 10N NaOH to pH 8 and stirring is continued for 1½ hours at 0°-5° C. The crystallised product is isolated by filtration, washed with ice-water and dried in vacuo at 50°-60° C., affording 40.3 g of 3-chloroacetanilide-4-methylsulfone.

40 g of the above compound are saponified in 400 ml of 1N NaOH for 1¼ hours at boiling temperature. The product is collected cold by filtration, washed with water and dried at 50°-60° C. in vacuo. Yield: 32.4 g of 3-chloroaniline-4-methylsulfone.

31.6 g of the above compound are stirred in 300 ml of tetrachloroethane and 10 ml of chlorosulfonic acid are added. The mixture is heated and stirred at reflux temperature until the evolution of HCl gas has ceased. The cooled suspension is filtered and washed with chloroform. The filter residue is dissolved in 200 ml of water and, after adjusting the pH to 7.5 with 10N NaOH, the somewhat turbid solution is clarified with activated charcoal. The clear filtrate is extracted with 100 ml of chloroform and the solution is then evaporated to dryness, affording 42.6 g of 5-chloroaniline-4-methylsulfone-2-sulfonic acid. The compound melts at 162°-170° C.

Diazotisation and Coupling 2.86 g of the above diazo component are dissolved in 50 ml of water, then 2.5 ml of 10N hydrochloric acid are added, and diazotisation is effected at 14°-16° C. with 2.5 ml of 4N sodium nitrite. The diazo solution is stirred briefly and then a small excess of nitrite is destroyed with sulfamic acid.

2.06 g of 3-diethylaminoacetanilide are dissolved in 50 ml of water with 2 ml of 10N hydrochloric acid and the solution is added to the above suspension of the diazonium salt. The coupling is complete after 18 hours at room temperature. The precipitate is isolated by filtration and washed with brine. The filter residue is dissolved in 75 ml of water with 2N NaOH at pH 7. The dye is salted out with sodium chloride, isolated by filtration, washed with brine and dried in vacuo at 60°-70° C., affording 4.85 g of a red dye which dyes polyamide in a pure shade of excellent lightfastness and with excellent fastness to formaldehyde and migration.

EXAMPLE 12

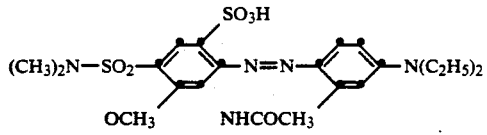

Preparation of 5-Methoxyaniline-2,4-disulfamide (Diazo Component)

In accordance with the particulars of U.S. Pat. No. 2,809,194, 150 ml of chlorosulfonic acid are added dropwise over 30 minutes with stirring to 24.6 g of m-anisidine cooled in an ice bath. After addition of chlorosulfonic acid is complete, 140 g of sodium chloride are added in portions over 1 hour. The mixture is heated for 2 hours on a steam bath and then for 3 hours in an oil bath to 150°-160° C., cooled thoroughly in an ice bath and treated with 500 ml of ice water. The product is taken up in ether, washed with water, dried, and the solvent is evaporated on a steam bath. The dry substance melts at 131°-133° C. with decomposition.

23 g of the disulfochloride are dissolved in 30 ml of acetone and the solution is added dropwise over 40 minutes to a mixture of 112 ml of 25% ammonia and 50 ml of acetone. The reaction mixture is stirred overnight in an ice bath, filtered, and the residue is dissolved in 150 ml of water at 75°-80° C. with 12 ml of conc. NaOH. The solution is filtered clear with activated charcoal, adjusted to pH 7 with 7 ml of hydrochloric acid, and the precipitated product is isolated by filtration, washed with water and dried. The compound has a melting point of 246°-247° C.

Diazotisation, Coupling and Alkylation of the Sulfamide Group 5.62 g of 5-methoxyaniline-2,4-disulfamide are added to 15 ml of sulfolane and dissolved at 70°-75° C. with heating and the gradual addition of 25 ml of water. Then 5 ml of 10N hydrochloric acid are added to the solution and the mixture is cooled to 2° C. Diazotisation is effected at 2°-4° C. with 10 ml of 4N sodium nitrite. After a short time a small excess of nitrite is destroyed with sulfamic acid.

4.12 g of 3-diethylaminoacetanilide was dissolved in 25 ml of water with 2.5 ml of 10N hydrochloric acid and the solution is added dropwise to the above suspension of the diazonium salt. The coupling is brought to completion at room temperature and the almost completely precipitated dye is isolated by filtration and washed with water. The moist filter residue is taken up in 60 ml of dimethyl phosphonate and the solution is heated to 140° C. bath temperature with stirring and after sprinkling in 17 g of sodium carbonate. Until a chromatogram shows the formation of a homogeneous compound, about 9 ml of water are distilled off from the boiling reaction solution. The reaction mixture is then poured into 125 ml of cold water and the solution is adjusted to pH 5 with 1N hydrochloric acid. The precipitated dye is isolated by filtration and washed with brine. The filter cake is taken up in 100 ml of water, the pH is adjusted to 7.5 with 2N NaOH, and the solution is evaporated to dryness after being filtered clear.

The red dye is most suitable for dyeing polyamide and has very good fastness to light, formaldehyde and migration.

EXAMPLE 13

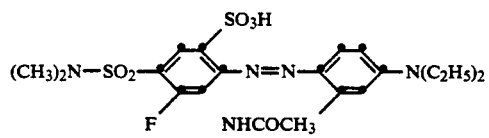

Preparation of 5-Fluoroaniline-4-dimethylsulfamide-2-sulfonic Acid (Diazo Component)

In accordance with the particulars of Chem. Ber. 85, pp. 577-82, 100 g of 98% sulfuric acid are added cautiously to 111 g of 3-fluoroaniline and the mixture is heated to 190° C. in an oil bath for 10 hours while introducing a weak flow of $N_2$. After the mixture has cooled, the congealed cake is dissolved in sodium carbonate solution and the non-sulfonated base is dissolved out by extraction with methylene chloride. The aqueous solution is clarified with activated charcoal, acidified with sulfuric acid, filtered clear and, after washing with ice-water, the 3-fluoroaniline-4-sulfonic acid is dissolved in water by addition of conc. NaOH and converted into the sodium salt at pH 7. The solution is evaporated to dryness in vacuo.

72.4 g of the sodium salt are covered with 75 ml of acetic anhydride and the mixture is heated and then kept for 1 hour at reflux. The mixture is then cooled and the precipitate is filtered with suction, washed with ether, and dried in vacuo over potassium hydroxide.

81.7 g of the acetyl compound are ground fine in a mortar with 73.5 g of phosphorus pentachloride and 10 ml of phosphoroxy chloride to a homogeneous paste, which is poured onto 500 g of ice after about 20 minutes. After homogenisation and filtration the product is washed neutral with water and dissolved in methylene chloride. The methylene chloride solution is washed with water, dried over sodium sulfate, clarified with activated charcoal and evaporated to dryness.

15.2 g of the resinous sulfochloride are dissolved in about 30 ml of acetone and the solution is added dropwise with cooling to 73 ml of 41% dimethylamine solution. The solution is stirred at room temperature until the acetone has evaporated and the residue is then taken up in methylene chloride. The methylene chloride solution is washed with water, dried, filtered clear with activated charcoal, and evaporated to dryness.

12.9 g of the resinous substance are saponified by boiling in 150 ml of 1N NaOH. The product is filtered cold, recrystallised from water and dried, giving 3-fluoroaniline-4-dimethylsulfamide with a melting point of 106°-110° C.

2.62 g of 3-fluoroaniline-4-dimethylsulfamide are dissolved in 24 ml of tetrachloroethane and 0.8 ml of chlorosulfonic acid are added to the solution. The mixture is heated and kept at boiling temperature until the evolution of HCl gas has ceased. The suspension is diluted at room temperature with about equal parts of water and methylene chloride and neutralised with NaOH. The organic phase is separated and the aqueous solution is washed again with methylene chloride, filtered clear with activated charcoal and evaporated to dryness.

Diazotisation and Coupling 3.28 g of the above diazo component are dissolved in 50 ml of water, then 2.75 ml of 10N hydrochloric acid are added and diazotisation is effected with 9 ml of 1N sodium nitrite at 14°-18° C. After brief stirring a small excess of nitrite is destroyed with sulfamic acid.

1.85 g of 3-diethylaminoacetanilide are dissolved in 11 ml of water by adding 1.1 ml of 10N hydrochloric acid and the solution is added to the above suspension of the diazonium salt. After 18 hours at room temperature the precipitated dye is isolated by filtration and washed with water. The filter cake is stirred in 80 ml of water at room temperature and the pH is adjusted to 7 with 2N NaOH. The dye is precipitated with sodium chloride, isolated by filtration, washed with brine, and dried in vacuo at 60°-70° C. It gives on polyamide a red dyeing of excellent fastness properties, especially lightfastness.

EXAMPLE 14

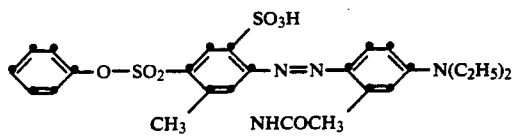

Preparation of 5-Methyl-4-phenoxysulfonylaniline-2-sulfonic Acid (Diazo Component)

37.3 g of 3-methylacetanilide are added at 15°-20° C. to 83 ml of chlorosulfonic acid and the solution is stirred overnight at room temperature, then added dropwise to a mixture of 600 g of ice and 50 g of sodium chloride. The precipitate is isolated by filtration and washed with ice-water. The filter cake is dissolved in 200 ml of methylene chloride and the solution is washed with water, dried, clarified with activated charcoal, and evaporated to dryness.

24.6 g of the resin obtained are dissolved in 35 ml of acetone and added dropwise over 45 minutes to a solution consisting of 9.87 g of phenol, 150 ml of water and 50 ml of acetone. The pH is kept at 9 with dilute NaOH until the reaction is complete and finally the precipitated product is dissolved in 150 ml methylene chloride. The methylene chloride solution is washed with dilute sodium carbonate solution and water and dried, clarified with activated charcoal, and evaporated to dryness.

25.5 g of the resin obtained are dissolved in 75 ml of glacial acetic acid and 75 ml of hydrochloric acid and saponified for 2½ hours at reflux temperature. After dilution with water the product is collected cold by filtration and washed with 100 ml of water. The filter cake is stirred in water and the pH is adjusted to 9 with a small amount of NaOH. The product is isolated by filtration, washed with water, and dried at 60°-70° C.

16.6 g of the compound obtained with a melting point of 102°-104° C. are dissolved in 126 ml of tetrachloroethane. Then 4.2 ml of chlorosulfonic acid are added and the mixture is heated to the boil. When the dehydrochlorination is complete, the precipitate is isolated by filtration at 100° C. and washed with chloroform. The filter cake is taken up in water and the pH is adjusted to 7 with NaOH. After washing with methylene chloride the aqueous solution is filtered clear with activated charcoal and evaporated to dryness.

Diazotisation and Coupling 5 g of the above diazo component are dissolved in 50 ml of water, then 3.6 ml of 10N hydrochloric acid are added, and diazotisation is effected with 12.8 ml of 1N sodium nitrite at 14°-18° C. A small excess of nitrite is destroyed after a short time with sulfamic acid.

2.63 g of 3-diethylaminoacetanilide are dissolved in 16 ml of water with 1.6 ml of 10N hydrochloric acid and the solution is added to the above suspension of the diazonium salt. The coupling is brought to completion with 4N sodium acetate at pH 3.5. The completely precipitated dye is isolated by filtration, washed with water and dried in vacuo at 60°-70° C.

When reduced with the stoichiometric amount of sodium carbonate, the dye has good water solubility, gives a red shade on polyamide from a weakly acid bath, and has good build-up and good general fastness properties.

The diazo components listed in Table II and further valuable water soluble dyes are obtained by procedures analogous to those described in Examples 1 to 14.

TABLE II

| No. | Diazo component | Y | X | Coupling component | Shade |
|---|---|---|---|---|---|
| 1 | NH₂, SO₃H, SO₂X substituted benzene (with Y) | Br | N(CH₃)₂ | 4-methyl-N,N-diethylaniline | red |
| 2 | " | F | " | " | " |
| 3 | " | CH₃ | " | " | " |
| 4 | " | OCH₃ | " | " | " |
| 5 | " | Br | " | N-ethyl-N-benzylaniline | scarlet |
| 6 | " | F | " | " | " |
| 7 | " | CH₃ | " | " | " |
| 8 | " | OCH₃ | " | " | " |
| 9 | " | Br | " | N,N-diethylaniline | yellowish red |
| 10 | " | F | " | " | yellowish red |
| 11 | " | CH₃ | " | " | yellowish red |
| 12 | NH₂, SO₃H, SO₂X substituted benzene (with Y) | OCH₃ | N(CH₃)₂ | N,N-diethylaniline | yellowish red |
| 13 | " | Br | " | 2-methylindole | yellow |
| 14 | " | F | " | " | " |
| 15 | " | CH₃ | " | " | " |
| 16 | " | OCH₃ | " | " | " |
| 17 | " | Br | " | pyrazole derivative (with NH, CH₃, phenyl) | greenish yellow |
| 18 | " | F | " | " | greenish yellow |
| 19 | " | CH₃ | " | " | greenish yellow |
| 20 | " | OCH₃ | " | " | greenish yellow |

TABLE II-continued

| No. | Diazo component | Y | X | Coupling component | Shade |
|---|---|---|---|---|---|
| 21 | " | Br | " | 4,5,6-triamino-pyrimidine | greenish yellow |
| 22 | " | F | " | " | greenish yellow |
| 23 | 2-amino-4-Y-benzene-1-SO$_2$X-5-SO$_3$H | CH$_3$ | N(CH$_3$)$_2$ | 4,5,6-triamino-pyrimidine | greenish yellow |
| 24 | " | OCH$_3$ | " | " | greenish yellow |
| 25 | " | Br | " | 2-aminonaphthalene | bluish red |
| 26 | " | F | " | " | " |
| 27 | " | CH$_3$ | " | " | " |
| 28 | " | OCH$_3$ | " | " | " |
| 29 | " | CH$_3$ | NH$_2$ | " | " |
| 30 | " | OCH$_3$ | " | " | " |
| 31 | " | CH$_3$ | " | 3-methyl-4-(N,N-diethylamino)aniline | red |
| 32 | " | OCH$_3$ | " | " | " |
| 33 | " | CH$_3$ | " | 3-acetamido-4-(N,N-diethylamino)aniline | " |
| 34 | " | OCH$_3$ | " | " | " |
| 35 | 2-amino-4-Y-benzene-1-SO$_2$X-5-SO$_3$H | CH$_3$ | NH$_2$ | 3-methyl-4-aminoaniline | orange |
| 36 | " | OCH$_3$ | " | " | " |

TABLE II-continued
| No. | Diazo component | Y | X | Coupling component | Shade |
|---|---|---|---|---|---|
| 37 | " | CH₃ | " | 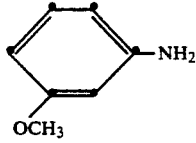 | " |
| 38 | " | OCH₃ | " | " | " |
| 39 | " | Cl | 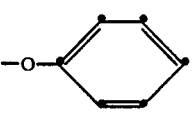 | 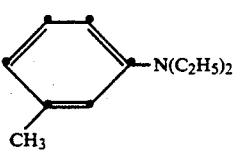 | bluish red |
| 40 | " | Br | " | " | " |
| 41 | " | F | " | " | " |
| 42 | " | CH₃ | " | " | " |
| 43 | " | OCH₃ | " | " | " |
| 44 | " | Cl | " | 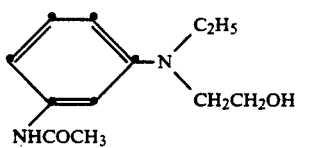 | " |
| 45 | 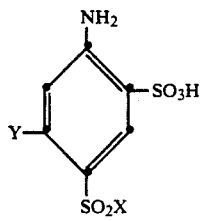 | Br | 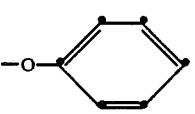 | 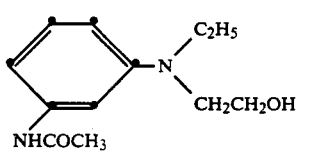 | bluish red |
| 46 | " | F | " | " | " |
| 47 | " | CH₃ | " | " | " |
| 48 | " | OCH₃ | " | " | " |
| 49 | " | Cl | " | 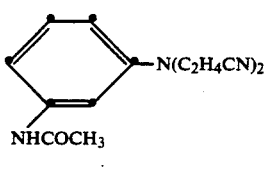 | orange |
| 50 | " | Br | " | " | " |
| 51 | " | F | " | " | " |
| 52 | " | CH₃ | " | " | " |
| 53 | " | OCH₃ | " | " | " |
| 54 | " | Cl | " | 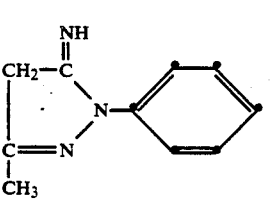 | greenish yellow |
| 55 | " | Br | " | " | greenish yellow |
| 56 | " | F | " | " | greenish yellow |
| 57 | " | CH₃ | " | " | greenish yellow |

TABLE II-continued

| No. | Diazo component | Y | X | Coupling component | Shade |
|---|---|---|---|---|---|
| 58 | NH₂, SO₃H, SO₂X substituted benzene with Y | OCH₃ | —O—phenyl | pyrazolone with NH, CH₂, C=N, CH₃, N-phenyl | greenish yellow |
| 59 | " | Cl | " | 2,4,6-triaminopyrimidine (NH₂, N, NH₂, N, NH₂) | greenish yellow |
| 60 | " | Br | " | " | greenish yellow |
| 61 | " | F | " | " | greenish yellow |
| 62 | " | CH₃ | " | " | greenish yellow |
| 63 | " | OCH₃ | " | " | greenish yellow |
| 64 | " | Cl | " | phenyl-N(C₄H₉)₂ | bluish red |
| 65 | " | Br | " | " | " |
| 66 | " | F | " | " | " |
| 67 | " | CH₃ | " | " | " |
| 68 | " | OCH₃ | " | " | " |
| 69 | " | " | " | phenyl-N(C₂H₅)₂ with NHCOCH₃ | " |
| 70 | NH₂, SO₃H, SO₂X substituted benzene with Y | F | —O—phenyl | phenyl-N(C₂H₅)₂ with NHCOCH₃ | greenish yellow |
| 71 | " | Cl | O—phenyl—Cl | " | greenish yellow |
| 72 | " | CH₃ | " | " | greenish yellow |
| 73 | " | Cl | " | phenyl-N(C₂H₅)₂ with CH₃ | greenish yellow |
| 74 | " | F | " | " | greenish yellow |
| 75 | " | CH₃ | " | " | greenish |

TABLE II-continued

| No. | Diazo component | Y | X | Coupling component | Shade |
|---|---|---|---|---|---|
| | | | | | yellow |
| 76 | " | Cl | (phenyl with O– and –OCH₃) | " | greenish yellow |
| 77 | " | Br | " | " | greenish yellow |
| 78 | " | F | " | " | greenish yellow |
| 79 | " | CH₃ | " | " | greenish yellow |
| 80 | " | OCH₃ | " | " | greenish yellow |
| 81 | (aniline with NH₂, SO₃H, Y, SO₂X) | Cl | (phenyl with O– and –OCH₃) | (phenyl–N(C₂H₅)₂) | bluish red |
| 82 | " | F | " | " | " |
| 83 | " | CH₃ | " | " | " |
| 84 | " | Cl | (phenyl with O– and CH₃) | " | " |
| 85 | " | CH₃ | " | " | " |
| 86 | " | " | " | (phenyl–N(C₂H₅)₂ with CH₃) | " |
| 87 | " | " | " | (pyrazolone structure: CH₂–C=O, C=N, CH₃, N–phenyl) | yellow |
| 88 | " | Cl | " | " | " |
| 89 | (aniline with NH₂, SO₃H, Y, SO₂X) | Cl | (naphthyl with O–) | (phenyl–N(C₂H₅)₂ with CH₃) | bluish red |
| 90 | " | CH₃ | " | " | " |

TABLE II-continued
| No. | Diazo component | Y | X | Coupling component | Shade |
|---|---|---|---|---|---|
| 91 | " | " | " | 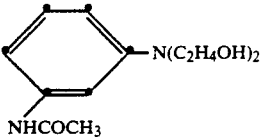 | " |
| 92 | " | Cl | " | | " |
| 93 | " | Cl | 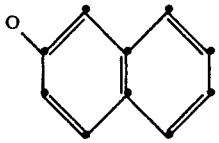 | | " |
| 94 | " | Cl | " | 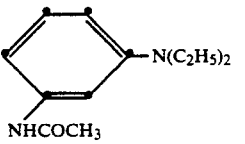 | " |
| 95 | " | CH₃ | " | | " |
| 96 | " | " | " | 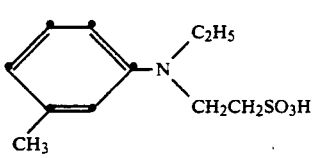 | " |
| 97 | " | Cl | " | " | " |
| 98 | 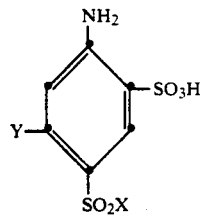 | Cl | 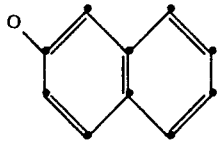 | 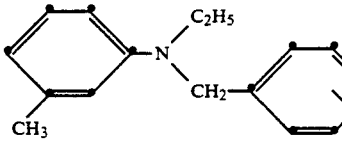 | bluish red |
| 99 | " | Cl | " | 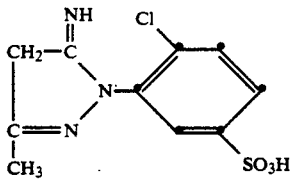 | yellow |
| 100 | " | CH₃ | " | " | " |
| 101 | " | Cl | CH₃ | 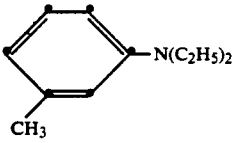 | red |
| 102 | " | CH₃ | " | " | " |
| 103 | " | F | " | " | " |
| 104 | " | Cl | C₂H₅ | " | " |
| 105 | " | Br | " | " | " |
| 106 | " | OCH₃ | " | " | " |

TABLE II-continued

| No. | Diazo component | Y | X | Coupling component | Shade |
|---|---|---|---|---|---|
| 107 | " | Cl | " | (phenyl with N(C₂H₅)₂ and NHCOCH₃) | " |
| 108 | " | Cl | CH₂CH₂OH | " | " |
| 109 | (structure with NH₂, SO₃H, Y, SO₂X) | CH₃ | CH₂CH₂OH | (phenyl with N(C₂H₅)₂ and HNCOCH₃) | red |
| 110 | " | Cl | " | (phenyl-N(C₂H₅)-CH₂-phenyl) | yellowish red |
| 111 | " | CH₃ | " | " | yellowish red |
| 112 | " | Cl | CH₂-phenyl | (phenyl with N(C₂H₅)₂ and NHCOCH₃) | red |
| 113 | " | CH₃ | " | " | " |
| 114 | " | Cl | " | (phenyl with N(C₂H₅)₂ and CH₃) | " |
| 115 | " | CH₃ | N(CH₃)₂ | (phenyl with N(C₂H₅)₂ and NHCOCH₃) | " |

EXAMPLE 15

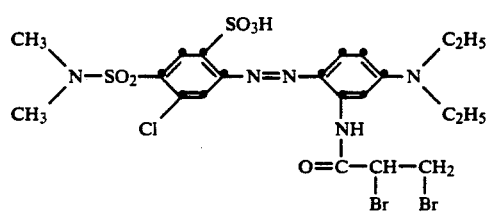

0.01 mole of 5-chloroaniline-4-dimethylsulfamide-2-sulfonic acid are diazotised as in Example 6.

Coupling 3.78 parts (0.01 mole) of 3-(α,β-dibromopropionylamino)-N,N-diethylaniline are suspended in 100 parts of water of 25° C. with 1.5 parts by volume of conc. hydrochloric acid. The above suspension of the diazonium salt is added in portions over 2 hours and the mixture is stirred for 12 hours at 25° C. The coupling is then complete and the dye is almost completely precipitated. The dye is then isolated by filtration, washed with 50 parts and dried in vacuo at 60° C., affording 6.3 parts of a brown powder.

A dyebath is prepared by suspending the dyestuff powder in water and dissolving it by adding 10% sodium carbonate solution while keeping the pH of the solution below 7.5. The red dyeing obtained on polyamide has excellent fastness to light, washing, and formaldehyde.

By repeating the procedure of this Example, but using as diazo and coupling components the compounds listed in Table III, there are also obtained valuable reactive dyes which dye wool and synthetic polyamide in orange to bluish red shades of dimilarly good fastness properties.

TABLE III

| No. | Diazo component | Coupling component | Shade on wool | Shade on Polyamide |
|---|---|---|---|---|
| 1 | 2-amino-4-chloro-5-sulfamoylbenzenesulfonic acid (SO₃H, NH₂—SO₂, Cl, NH₂) | 8-hydroxy-6-sulfo-2-[N-methyl-N-(2,3-dibromopropanoyl)amino]naphthalene | | reddish blue |
| 2 | " | 8-hydroxy-6-sulfo-2-(2,3-dibromopropanoylamino)naphthalene | | scarlet |
| 3 | " | N,N-diethyl-N'-[bis(chloro/isopropoxy-triazinyl)amidino]-p-phenylenediamine | | bluish red |
| 4 | 2-amino-4-chloro-5-sulfamoylbenzenesulfonic acid | 4-[N-ethyl-N-(2-(2,3-dibromopropanoylamino)ethyl)amino]-3-methylbenzene | | red |
| 5 | 2-amino-4-chloro-5-(N,N-dimethylsulfamoyl)benzenesulfonic acid | 8-hydroxy-6-sulfo-2-(2,3-dibromopropanoylamino)naphthalene | | scarlet |
| 6 | " | N,N-diethyl-N'-(2,3-dibromopropanoyl)-p-phenylenediamine | | red |
| 7 | " | N-ethyl-N-[2-(2,3-dibromopropanoyloxy)ethyl]aniline | | yellowish red |

TABLE III-continued

| No. | Diazo component | Coupling component | Shade on wool | Shade on Polyamide |
|---|---|---|---|---|
| 8 | (phenyl-O-SO₂-benzene with SO₃H, NH₂, Cl substituents) | (naphthalene with OH, SO₃H, N(CH₃)-CO-CHBr-CH₂Br) | scarlet | |
| 9 | " | (phenyl-N(C₂H₅)₂ with NH-C(=N)-triazine bearing Cl and O-CH(CH₃)₂) | | bluish red |
| 10 | " | (phenyl-N(C₂H₅)₂ with NH-C(=N)-triazine bearing F and OC₂H₅) | | bluish red |
| 11 | (phenyl-O-SO₂-benzene with SO₃H, NH₂, Cl substituents) | (phenyl-N(C₂H₅)₂ with NH-C(=N)-triazine bearing F and O-CH₂-CH₂-O-CH₂-CH₃) | | bluish red |
| 12 | " | (phenyl-N(CH₂CH₂CN)(CH₂CH₂-O-CO-CHBr-CH₂Br)) | scarlet | |
| 13 | " | (phenyl with CH₃, N(C₂H₅)(CH₂CH₂-NH-CO-CHBr-CH₂Br)) | | bluish red |

TABLE III-continued

| No. | Diazo component | Coupling component | Shade on wool | Shade on Polyamide |
|---|---|---|---|---|
| 14 | 2,4-(CH₃)(N(CH₃)₂SO₂)-5-(SO₃H)-aniline with SO₂N(CH₃)₂, CH₃, SO₃H, NH₂ substituents | 8-hydroxy-6-sulfo-2-naphthyl-NH-CO-CHBr-CH₂Br | | yellowish red |
| 15 | " | 4-(N(C₂H₅)₂)-phenyl-NH-CO-CHBr-CH₂Br | | yellowish red |
| 16 | " | 4-(N(C₂H₅)₂)-phenyl-NH-C(=N-triazine with F and O-CH₂-CH₂-O-CH₂-CH₃) | | red |
| 17 | 2-CH₃-4-(C₆H₅-O-SO₂)-5-(SO₃H)-aniline | 4-[N(CH₂CH₂CN)(CH₂CH₂NH-CO-CHBr-CH₂Br)]-phenyl | | scarlet |
| 18 | " | 3-CH₃-phenyl-N-(CH₂-CH₂-O-CO-CHBr-CH₂Br)₂ | | yellowish red |
| 19 | " | 4-(N(C₂H₅)₂)-phenyl-NH-C(=N-triazine with F and O-C₂H₅) | | red |

TABLE III-continued

| No. | Diazo component | Coupling component | Shade on wool | Shade on Polyamide |
|-----|-----------------|--------------------|--------------|---------------------|
| 20 | (phenyl)—O—SO₂—(benzene with SO₃H, NH₂, CH₃) | (phenyl with N(C₂H₅)₂, NH—C(=N-triazine with Cl and O—CH(CH₃)₂)) | | red |
| 21 | (CH₃)₂N—SO₂—(benzene with SO₃H, NH₂, F) | (phenyl with N(C₂H₅)₂, NH—CO—CHBr—CH₂Br) | | red |
| 22 | (phenyl)—O—SO₂—(benzene with SO₃H, NH₂, F) | " | | bluish red |
| 23 | (phenyl)—O—SO₂—(benzene with SO₃H, NH₂, F) | (naphthalene with OH, SO₃H, NH—CO—CHBr—CH₂Br) | | red |
| 24 | " | (phenyl with N(C₂H₅)₂, NH—C(=N-triazine with Cl and NH-phenyl)) | | bluish red |
| 25 | (CH₃)₂N—SO₂—(benzene with SO₃H, NH₂, Cl) | (phenyl with N(C₂H₅)₂, NH—C(=N-triazine with Cl and N(CH₃)-phenyl)) | | red |

TABLE III-continued

| No. | Diazo component | Coupling component | Shade on wool | Shade on Polyamide |
|---|---|---|---|---|
| 26 | CH₃\N-SO₂-[benzene with SO₃H, NH₂, Cl]; CH₃/ | [benzene-NH-C(=...)N-N=C(Cl)-N(C₂H₅)-phenyl with N(C₂H₅)₂ and N(C₂H₅)] | red | |

Dyeing Procedure I 10 parts of Helanca ® tricot are dyed in 500 parts of an aqueous liquor which contains 2 g/l of ammonium acetate and which is adjusted with acetic acid to pH 5. The amount of dye of Example 1 is 2%, based on the weight of the fabric. The fabric is dyed for 30 to 90 minutes at a temperature of 98° C. The dyed tricot is then removed from the bath and washed and dried in the usual manner. The tricot is dyed in a pure red shade of good general fastness properties.

Dyeing Procedure II 10 parts of Helanca ® tricot are dyed in 500 parts of an aqueous liquor which contains 1 g/l of monosodium phosphate and which is adjusted to pH 6 with disodium phosphate. The amount of dye of Example 3 is 2%, based on the weight of the fabric. The fabric is dyed for 30 to 90 minutes at 98° C., then removed from the bath and washed and dried in the usual manner. The tricot fabric is dyed in a pure red shade of good general fastness properties.

Dyeing Procedure III 10 parts of wool are dyed for 30 to 90 minutes at a temperature of 98° C. in 500 parts of an aqueous liquor containing, based on the weight of the fabric, 4% by weight of ammonium sulfate, 1.5% by weight of 80% acetic acid, 1% by weight of a substituted alkylaminopolyglycol ether and 3% by weight of the dye of Example 4. The bath is then cooled to 80° C., neutralised with 2.5% by weight of 25% aqueous ammonia, and the fabric is treated for 15 minutes of this temperature. The wool is then removed from the bath and washed and dried in the usual manner. The wool is dyed in a pure red shade of good general fastness properties.

Dyeing Procedure IV 3 parts of the dye obtained in Example 5 are dissolved in 100 parts of water with the simultaneous addition of 0.5 part of sodium m-nitrobenzenesulfonate. A cotton fabric is impregnated with this solution to a liquor pick-up of 75% and then dried. The fabric is thereafter impregnated with a warm solution of 20° C. which contains, per liter, 10 ml of aqueous sodium hydroxide solution and 250 parts of sodium chloride, squeezed out to a pick-up of 75%, steamed for 30 seconds and 100° to 103° C., rinsed, soaped for a quarter of an hour in a 0.1% boiling solution of a non-ionic detergent, rinsed, and dried. A red dyeing is obtained.

What is claimed is:

1. The azo dye of the formula

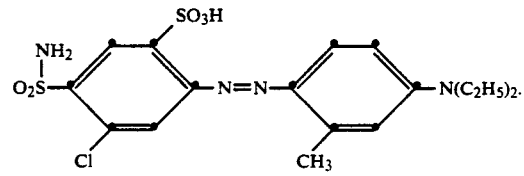

2. The azo dye of the formula

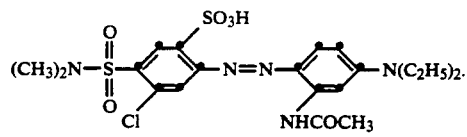

* * * * *